United States Patent
Cardinale et al.

(10) Patent No.: US 7,710,060 B2
(45) Date of Patent: May 4, 2010

(54) METHOD FOR MANAGING SYSTEMS PROVIDED WITH REDUNDANT ACTUATORS

(75) Inventors: Matteo Cardinale, Grugliasco (IT); Emanuele Carpanzano, Bellinzago Lombardo (IT); Massimiliano Carracoi, Palermo (IT); Michele De Chirico, Via Colgiansesco (IT); Antonella Lacasella, Adelfia (IT); Saverio Masotti, Noicattaro (IT); Ernesto Mininno, Valenzano (IT)

(73) Assignees: Prima Industrie S.p.A., Collegno (Torino) (IT); Sintesi ScpA, Modugno (Bari) (IT)

( * ) Notice: Subject to any disclaimer, the term of this patent is extended or adjusted under 35 U.S.C. 154(b) by 939 days.

(21) Appl. No.: 11/500,393

(22) Filed: Aug. 8, 2006

(65) Prior Publication Data
US 2007/0040527 A1    Feb. 22, 2007

(30) Foreign Application Priority Data
Aug. 16, 2005    (IT)    ............................ TO2005A0578

(51) Int. Cl.
G05B 19/18    (2006.01)
G05B 19/41    (2006.01)
B25J 9/16    (2006.01)

(52) U.S. Cl. .............................. 318/568.1; 318/568.17; 318/569; 318/600

(58) Field of Classification Search .............. 318/568.1, 318/568.17, 568.22, 561, 569, 571, 574, 318/600, 114, 115
See application file for complete search history.

(56) References Cited

U.S. PATENT DOCUMENTS

| | | | | |
|---|---|---|---|---|
| 5,011,282 A | * | 4/1991 | Ream et al. ................ | 356/153 |
| 5,109,148 A | * | 4/1992 | Fujita et al. ............ | 219/121.82 |
| 5,751,585 A | * | 5/1998 | Cutler et al. ................ | 700/161 |
| 5,798,927 A | | 8/1998 | Cutler et al. | |
| 5,847,960 A | * | 12/1998 | Cutler et al. ................ | 700/187 |
| 6,723,949 B2 | * | 4/2004 | Yamazaki et al. ...... | 219/121.67 |

FOREIGN PATENT DOCUMENTS

| WO | WO 02/02281 A | 1/2002 |
|---|---|---|
| WO | WO 2006/075209 A2 | 7/2006 |

OTHER PUBLICATIONS

European Search Report—issued Dec. 12, 2006.

* cited by examiner

Primary Examiner—Walter Benson
Assistant Examiner—Eduardo Colon-Santana
(74) Attorney, Agent, or Firm—Nixon & Vanderhye P.C.

(57) ABSTRACT

The invention relates to a method for managing systems provided with redundant actuators of the type comprising at least a first system operating according to a first set of variables, representative of a physical quantity to be controlled and a second system operating according to a second set of said variables, representative of a physical quantity to be controlled, said first set of variables and second set of variables identifying one or more redundant variables. The method comprises the operations of commanding the actuators of the system through a numeric control unit and a servo control module to follow trajectories of the variables as a function of a set sequence.

12 Claims, 4 Drawing Sheets

METHOD FOR MANAGING SYSTEMS PROVIDED WITH REDUNDANT ACTUATORS

The present invention relates to methods for managing systems provided with redundant actuators, in particular operating machines with redundant axes. The invention is nevertheless not limited to operating machines only, but extends to all possible machine architectures (not merely planar Cartesian architectures) with redundant kinematics obtained by introducing two or more axes actuated along one or more kinematic degrees of freedom, or to systems that operate according to redundant variables.

More in particular, the invention relates to a method for managing systems provided with redundant actuators of the type comprising at least a first system operating according to a first set of variables, representative of a physical quantity to be controlled and a second system operating according to a second set of said variables, representative of a physical quantity to be controlled, said first set of variables and second set of variables identifying one or more redundant variables, said method comprising the operations of:

commanding said actuators of said system through a numeric control unit and a servo control module to follow trajectories of said variables as a function of a set sequence.

Although the embodiment to be described herein pertains to a case in which the variables are to spatial variables relating to Cartesian axes, and therefore the resulting trajectory is a curve that lies in a plane, trajectories of variables generally mean curves in an n-dimensional space identified by n variables, said n variables not necessarily representing spatial quantities, but also other types of quantities, such as temperature.

An operating machine is defined redundant when the number of its joints is higher than the degrees of freedom needed to describe the operating space. This entails infinite possible configurations of the joints that accomplish the desired positioning and orientation for the terminal member.

The set of redundant solutions enables to obtain a more flexible operating machine, both in terms of kinematic configurations and in the interaction with the surrounding environment. In particular, redundancy can be exploited to comply with the constraints imposed by the work space, not to violate physical constraints of the operating machine itself and to execute trajectories without collisions.

The fundamental aspect of the analysis of a redundant operating machine is to manage redundancy identifying a relationship between the co-ordinates of the terminal member in Cartesian space and those in the space of the joints.

The position and the orientation of the terminal member in Cartesian space are linked to the space of the joints by the following direct kinematic law:

$$p(t)=f(q(t)) \quad (1)$$

where $p \in R^m$ represents the position of the terminal member in Cartesian space, where m is an integer representing the number of Cartesian axes;

$q \in R^n$ represents the displacement of the joints, where n is an integer representing the number of axes of the joints;

$f(\cdot)$ is a continuous non linear function.

A study of the reverse kinematics is then applied, to find an appropriate configuration of the joints q(t) as a function of the position of the terminal member p(t) through the relationship:

$$q(t)=f^{-1}(p(t)) \quad (2)$$

The solution of equation (2) is not easy because of the non linearity of the function $f(\cdot)$.

Usually, the reverse kinematics problem for an operating machine is confronted as a function of speeds, because there is a linear relationship between the speed of the terminal member, designated as ($\dot{p}(t)$) and the speed of the joints ($\dot{q}(t)$), which can be obtained differentiating the equation (1) relative to time:

$$\dot{p}(t)=J(q(t))\dot{q}(t) \quad (3)$$

where $J(q(t)) \in R^{n \times m}$ is the Jacobian defined as $$J(q(t)) = \frac{\partial f(q(t))}{\partial q(t)} \quad (4)$$

When an operating machine is not redundant, the Jacobian $J(q(t))$ is square and the speed of the joints $\dot{q}(t)$ can be determined solving the equation (3) relative to the vector of the speeds of the joints in non singular configurations, as indicated in the equation (5) that follows:

$$\dot{q}(t)=J^{-1}\dot{p}(t) \quad (5)$$

The position of the joints q(t) is obtained integrating the speed of the joints $\dot{q}(t)$ for a given initial value of position q(0).

However, in a redundant operating machine the equation (3) is under-determined, since m<n, and the matrix $J(q(t))$ is thus not square. The speed of the joints of a redundant operating machine can be expressed as:

$$\dot{q}(t)=J^+\dot{p}(t)+JP\dot{q}_a \quad (6)$$

where $J^+$ is the pseudo-reverse of the Jacobian, P is a matrix (n×n) such that its image coincides with the null space of J, $\dot{q}_a$ is an arbitrary vector in the space $\dot{q}(t)$.

The equation (6) is then of the form:

$$\dot{q}(t)=\dot{q}_{part}+\dot{q}_{hom} \quad (7)$$

where $\dot{q}_{part}$ is a particular solution that achieves the desired movement and $\dot{q}_{hom}$ is the homogeneous solution of the equation (5). This homogeneous solution $\dot{q}_{hom}$ can be used to optimise the performance of the operating machine if selected in such a way as to advantageously use the redundant degrees of mobility. The role of the particular solution $\dot{q}_{part}$ is to generate internal motions of the structure, which do not modify the position and orientation of the terminal member and which can allow for example to identify dextrous postures of the operating machine for the execution of an assigned task.

The object of the invention is to provide a method that optimally manages the redundant degrees of freedom, or axes, according to the performance of the system or of the operating machine.

According to the invention, said object is achieved thanks to the fact that the method comprises the operations of:

interpolating said sequence to obtain a trajectory of the system with redundant actuators, operating a filtering on said trajectory of the system with redundant actuators to generate a trajectory of the first system, calculating a second trajectory of the second system as difference trajectory between said trajectory of the system with redundant actuators and said trajectory of the first system, providing said trajectory of the first system to said servo-control for the actuation of the first system.

Thanks to this solution idea, it is possible to calculate in simple fashion the splitting and the uncoupling of the trajectories relating to the two systems, with low computation cost in particular for the second system, whose movement is determined starting from the filtering operated to generate the trajectory of the first system.

According to a preferred embodiment of the invention, the filtering operated to generate the trajectory of the first system is a filtering applied to the trajectory of the actuator system.

The invention shall now be described in detail with reference to the accompanying drawings, provided purely by way of non limiting example.

Hereafter, by way of example of a system implementing the method according to the invention, a laser operating machine is described, of the type disclosed in the Italian patent application no. TO2005A000016 in the name of the same Applicant.

Figure 1:
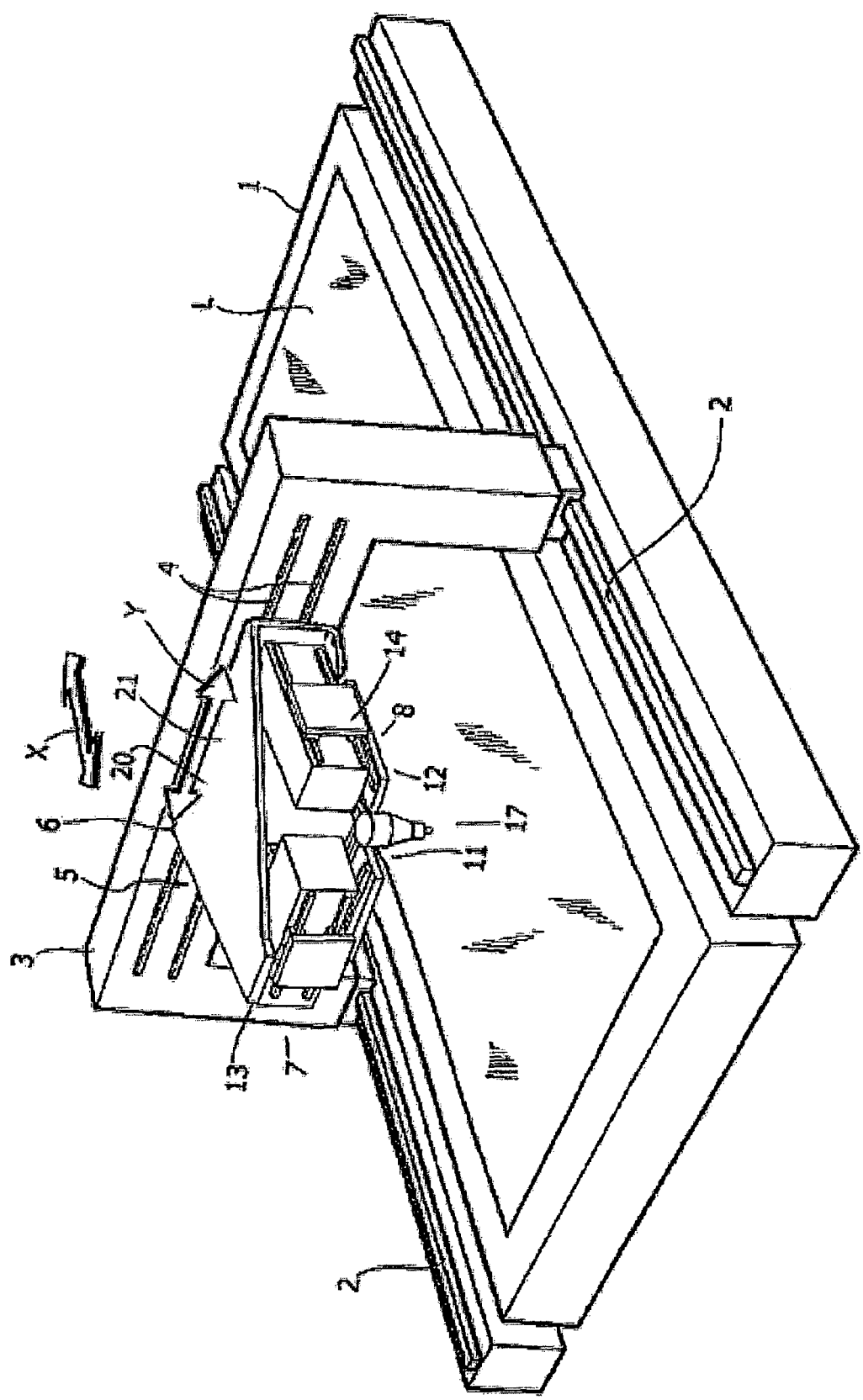
FIG. 1 is a schematic perspective view of a laser operating machine according to a first embodiment of the invention.
Figure 2:
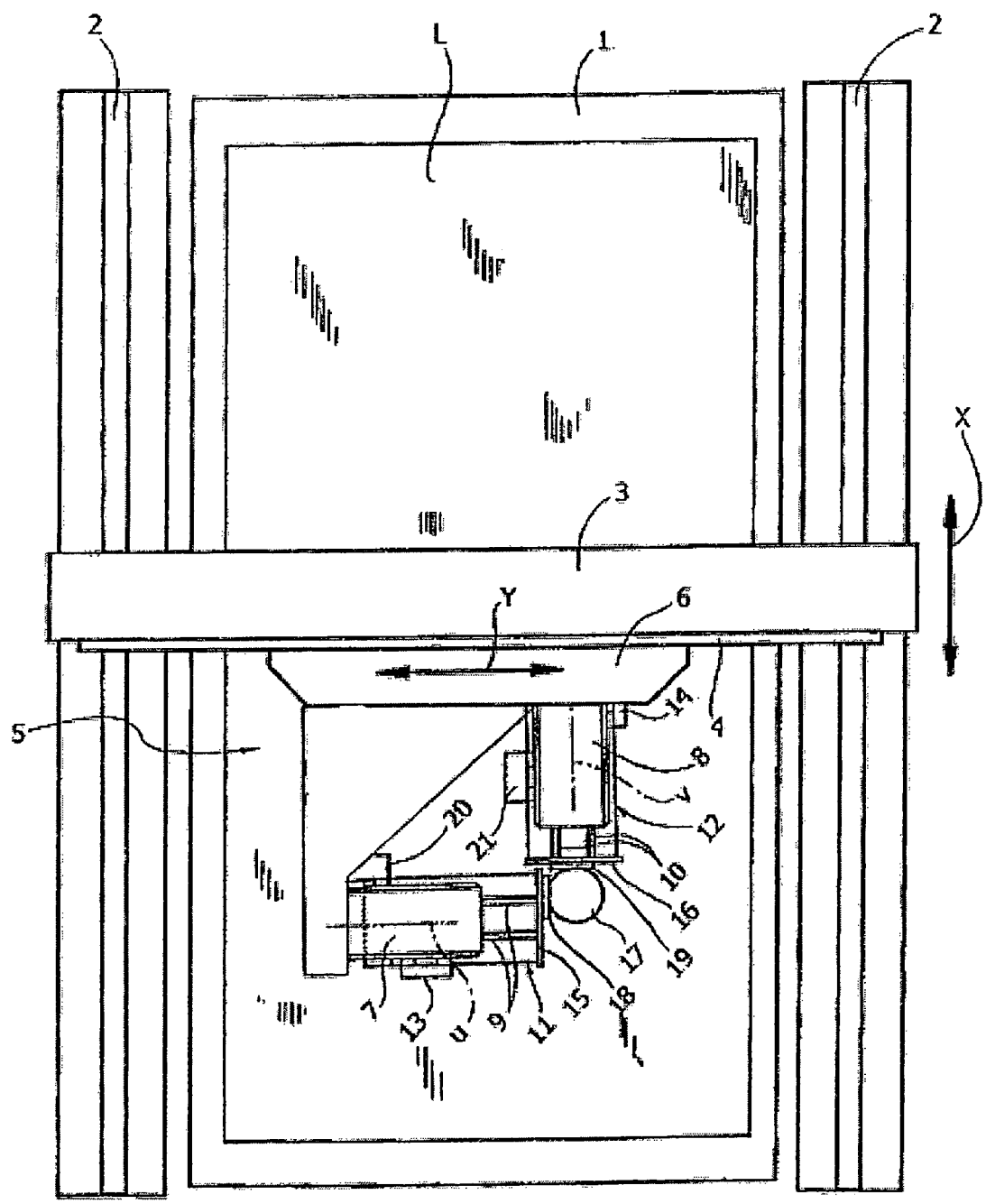
FIG. 2 is a plan top view in enlarged scale of FIG. 1.

Referring initially to FIGS. 1 and 2, the laser operating machine essentially comprises a horizontal base 1 whereon is horizontally positioned a piece to be machined, typically a metal plate L, also of large dimensions, and along two opposite sides of which extend two longitudinal guides 2 for a support structure 3. The support structure 3 has for example a general portal configuration extending transversely to the base 1 and it can be linearly displaced along the guides 2 according to a first horizontal Cartesian axis X. The displacements of the support structure 3 relative to the base 1 in the direction of the axis X are operated, through actuator sets that are generally conventional and not shown in the drawings, because they are known to those skilled in the art, with movements at relatively low accelerations and speeds, substantially throughout the longitudinal extension of the base 1.

The support structure 3 in turn bears sliding guides 4 arranged according to a horizontal Cartesian axis Y orthogonal to the axis X, along which a movable equipment can be translated, globally designated by the reference number 5. The linear displacements of the movable equipment 5 along the axis Y are also operated with movements at relatively low accelerations, substantially throughout the transverse extension of the base 1, through motorised actuators, also conventional and not shown in the drawings, because they are also known to those skilled in the art.

Hence the support structure 3 and the movable equipment 5 define a first system, movable along the axes X and Y.

The movable equipment 5 comprises a slide 6 movable along the guides 4 above the piece L to be machined and bearing a pair of guiding blocks 7,8 positioned horizontally and, relative to the support structure 3, according to a generally "V" shaped configuration. The guiding blocks 7,8 are inferiorly provided with respective sliding guides (not shown) along which slidably engage sliding blocks 9,10 borne respectively by a first slide 11 and by a second slide 12.

The slides 11, 12 are linearly displaceable relative to the blocks 7,8 along two mutually orthogonal horizontal Cartesian respectively designated u and v. The displacement of each slide 11, 12 is operated by means of a respective actuator 13, 14, constituted for example by a linear or rotary electric motor with screw and nut screw transmission, or the like.

Two slides 11, 12 bear, at the respective front sides, respective guides 15,16 whereon is slidable a laser cutting head 17 with vertical axis provided in generally known fashion with an optical system (e.g. a reflection or fibre optics system) for focusing a laser beam, emitted by a laser source, on the piece L to be machined. The laser source and the focusing system are not shown for the sake of brevity, since they are both conventional and known to those skilled in the art.

The laser head 17 is provided with a pair of lateral cursors 18 and 19, e.g. constituted by sliding blocks or carriages, movable along the front guides 15 and 16 of the slides 11 and 12.

Hence the laser head 17, movable thanks to the slides 11 and 12, defines a second system, movable along the axes u and v.

Figure 3:
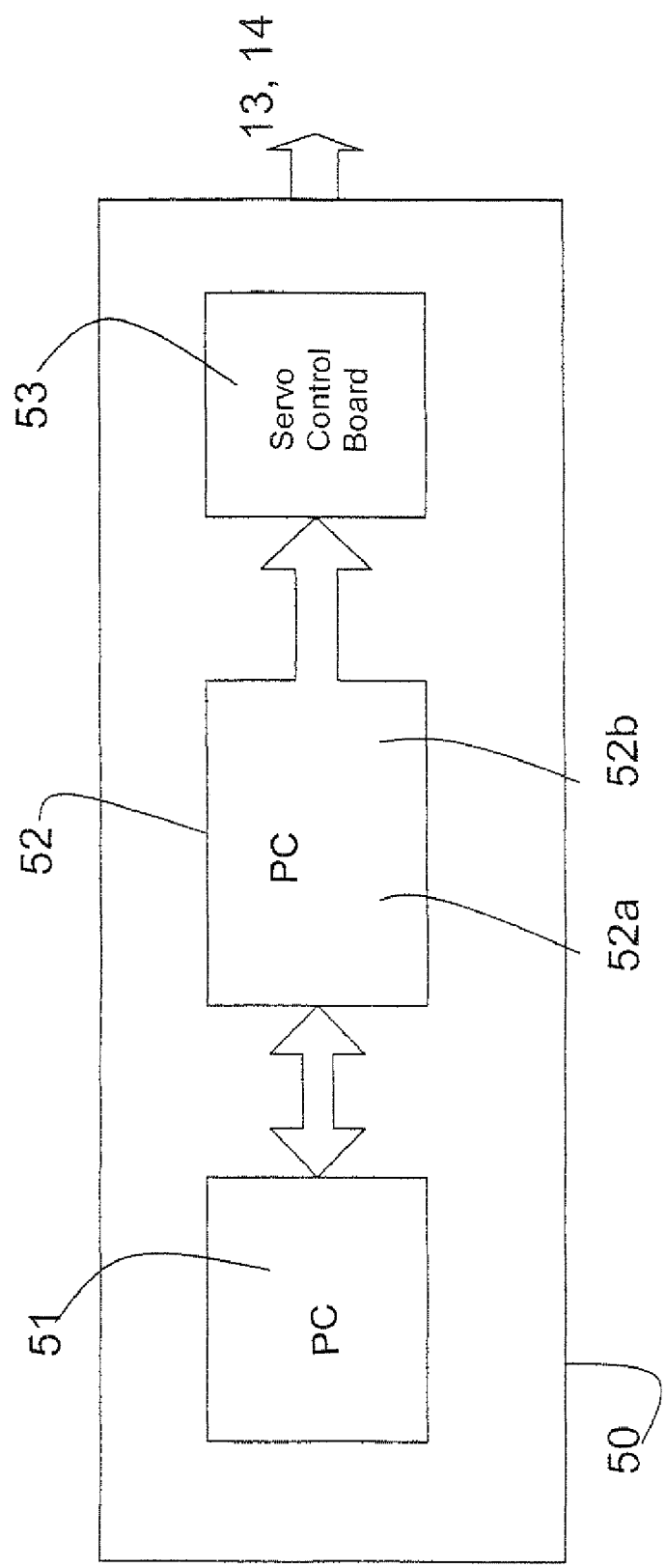
FIG. 3 is a block diagram of a control unit of the machine shown in FIGS. 1 and 2.

The motors 13 and 14 are operatively connected to a numeric control unit 50, which shall be illustrated hereafter with reference to FIG. 3. Said numeric control unit 50 commands the operation according to predetermined programmes according to the machining needs of the piece L, and in co-ordinated fashion with the actuators that command the displacements of the movable equipment 5 along the guides 4 in the direction of the axis Y, as well as with the actuators that command the displacements of the support structure 3 in the direction of the axis X. Said programs shall be arranged to move the laser head 17 along the axes u and v, in substantially continuous fashion, within a relatively restricted spaces and with extremely high speeds and accelerations, whilst the displacements of the movable equipment 5 along the axis Y and the displacements of the support structure 3 in the direction of the axis X are accomplished with relatively low accelerations, in a relatively ample space.

The actuators 20 and 21 for movable balancing masses are also operatively connected to the programmable control unit 50 of the machine, so that all masses in motion during the machining of the piece L are co-ordinated to assure continuity of motion.

It should be noted that the laser head 17, or part thereof, may also be displaceable along a vertical axis Z, by means of a suitable motorised actuator, also connected to the control unit of the machine.

Hence, the axes X and Y pertaining to the first system, which transport throughout the work area of the machine the small working volume of the laser head 17, have low acceleration (by way of example, less than or equal to 12 m/s$^2$) and high maximum speed (about 1.7 m/s), whilst the axes u and v pertaining to the second system have high acceleration (by way of example, greater than or equal to 50 m/s$^2$), but low speed (about 0.5 m/s). Globally, the axes of the machine inclusive of the first system and of the second system are five.

The resulting laser operating machine operates in two dimensions, but with redundant Cartesian axes (the axis u is parallel to the axis X, similarly the axis v is parallel to the axis Y) which co-operate for the displacement of the TCP (Tool Centre Point), i.e. the operating reference point of the laser head 17.

For the control of said laser operating machine it is therefore necessary to co-ordinate the movements of the axes of the first system X and Y and of the axes of the second system u and v respectively, taking into account that the axes of the first system X and Y have the task of transferring the head 17 with continuity throughout the work area, dynamically tracking the movements of said head 17 without the axes of the second system u and v having to stop to wait for the movement of the axes of the first system X and Y.

FIG. 3 shows an outline of the architecture of the numeric control unit 50 to manage the control of the actuations, which comprises two personal computers 51 and 52.

The personal computer 51 implements a Windows operating system and it operates as user interface to send instructions and commands to the second personal computer 52, which comprises a Linux operating system 52a associated to Real Time extensions 52b for the management of the machine. The personal computer 52 then provides the trajectories to be executed to a DSP PCI servo control board 53 for control of the actuators, among them the actuators 13 and 14 which move the slides 11 and 12 and the actuators of the support 3 and of the movable equipment 5.

In the personal computer 52 and in the servo control board 53 is implemented a procedure for managing the redundant axes which is better described with reference to FIG. 4.

Figure 4:
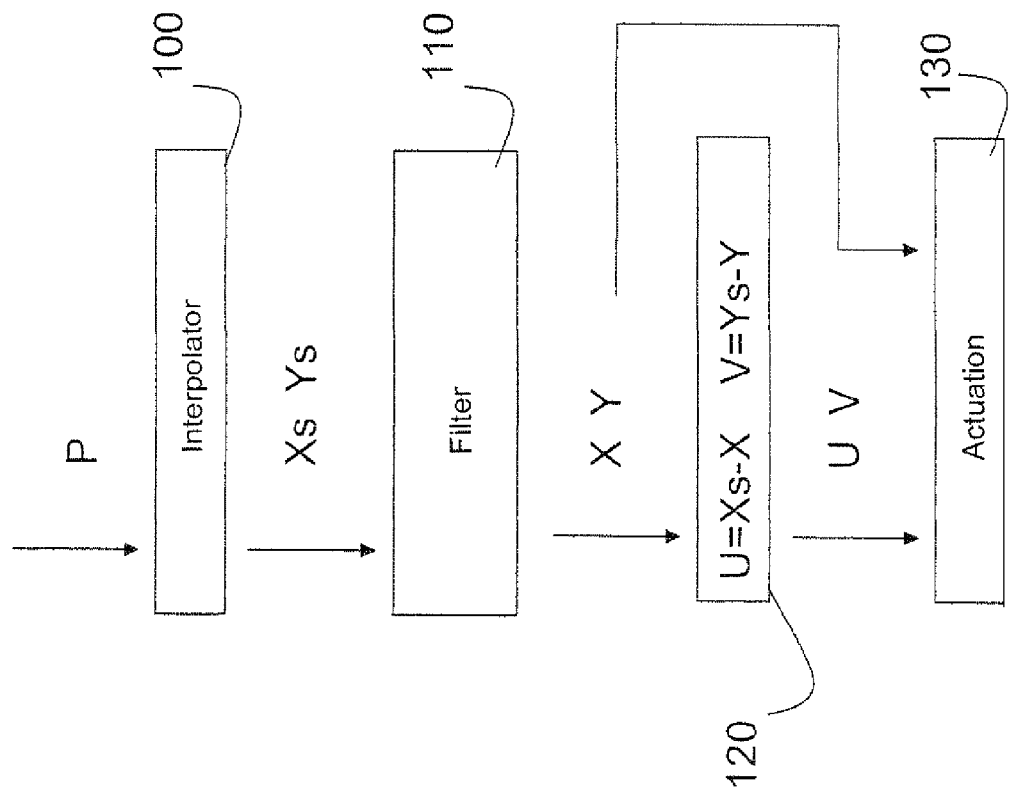
FIG. 4 is a flow chart of operations performed in the control unit of FIG. 3.

FIG. 4 thus shows a flow chart illustrating said procedure for managing the redundant axes.

The numeric control unit 50, according to procedures that are known in themselves in the state of the art, generates a sequence of instructions P, corresponding to a so-called 1part program' for a "virtual" machine with determined acceleration and speed specifications. This sequence of instructions P comes from the personal computer 51, and it is originated by a dedicated program, to set the trajectories and the movements of the machine offline.

The reference number 100 in FIG. 4 designates an interpolator block, in which an interpolation function is executed which provides, based on the sequence of instructions P and on the generation of the trajectory of the operating machine (Xs, Ys). Said interpolator block 100 operates in response to a preparation code 101, or G-Code, sent within the sequence of instructions P. The G-code within the scope of numeric control of machines and of CAM (Computer Aided Manufacturing), as is well known, identifies a preparatory function represented by the letter G and a value that identifies the function to be initiated, e.g. axes motion, change of planes, etc. The interpolator block 100 is implemented via software inside the personal computer 52.

Said trajectory of the machine (Xs, Ys) is input to a block 110, in which to said trajectory of the machine (Xs, Ys) is applied a filtering function whose output is constituted by a trajectory of the first system (X, Y).

The filtering block 110 operates in such a way as to remove, i.e. to filter, from the trajectory of the machine (Xs, Ys) specific trajectory characteristics that are not to be executed by the first system.

By way of example, the filtering block 110 implements a filtering function to remove from the trajectory of the machine (Xs, Ys) excursions having a small modulus of the distance to be travelled, below a predetermined threshold. Similarly, the filtering block 110 can be configured to remove particular trajectory elements that require to operate with small angles or radii of curvature, in this case, too, below a predetermined threshold value, and hence better suited to be executed by the second system. The filtering block 110 can also remove characteristics relating to the presence of sharp edges, or of complex curves.

The filtering block 110 can operate in such a way as to assure conformity with the specific dynamics of each of the two systems, filtering determined spectral components associated with the trajectory, in particular filtering the high frequency component of the trajectory of the machine (Xs, Ys).

Moreover, the filtering block 110 can also be provided to operate the filtering of specific shapes and curves.

The trajectory of the first system (X, Y) is delivered both to the input of a block 120, and in parallel to an actuation block 130, which represents the function of the servo-control board that commands actuation, in this case of the first system comprising the support structure 3 and the movable equipment 5 which move along the axes X and Y.

In a block 120, by difference from the trajectory of the machine (Xs, Ys), is obtained the trajectory of the second system (u, v) relative to the head 17. Thus, by definition the trajectory resulting from the sum of the trajectory of the first system (X, Y) and of the trajectory of the second system (u, v) corresponds to the trajectory of the machine (Xs, Ys), described in the sequence of instructions P.

The characteristics removed by the filtering block 110 are thus found in the trajectory of the second system (u, v) as obtained by the block 120.

The operation of calculating a second trajectory of the second system (u, v) as difference trajectory comprises the step of obtaining complementary trajectory elements, with modulus, angle or radius of curvature below a predetermined threshold, or high frequency components as trajectory of the second system (u, v), operating differences between the components (u=Xs−X; v=Ys−Y) of the trajectory of the machine (Xs, Ys) and of the trajectory of the first system (X, Y).

A change to the calibration files enables to generate the trajectories to be followed by the so-called Tool Centre Point (TCP), i.e. the reference point of the head 17, exploiting the maximum possible dynamics of the two systems, i.e., for example, obtaining the maximum tangential acceleration of the second system constituted by the head 17, e.g. 50 m/s², and the maximum tangential speed of the first system related to support structure 3 and movable equipment 5, e.g. 1.667 m/s. In this way the generated trajectory references refer to the sum axis, whose movement in the operating space is given by the sum of the displacements of the first system, relating to the support 3 and to the movable equipment 5, and to the second system relating to the laser head 17.

Naturally, the construction details and the embodiments may be widely varied from what is described and illustrated herein, without thereby departing from the scope of the present invention, as defined in the appended claims.

The filtering operated on the trajectory of the machine may be of different types according to the dynamic characteristics to be allocated on the different systems.

It is also clear that the present method extends to machines or manipulators comprising any number of redundant axes and any number of systems. The invention is thus not limited to laser operating machines only, but extends to all possible machine architectures (not merely planar Cartesian architectures) with redundant kinematics obtained by introducing two or more axes actuated along one or more kinematic degrees of freedom.

More in general, given a physical and/or engineering problem characterised by n degrees of freedom and a set of control technologies available to solve it (sensors, actuators, control software and hardware), for which a control system with n inputs and n outputs would need to be obtained, whose performance would be limited by the limitations of available technological solutions, a redundant physical and/or engineering system with n+m degrees of freedom (with m>=1) can be obtained, which enables, for equal technological limitations, to improve the performance of the system, using the additional degrees of freedom to optimise a given target function (in general, weighted sum of multiple factors such as costs, consumption, speed, accuracy, reliability, sustainability, etc.) through, for example, the frequency uncoupling of the redundant variables.

Possible application consequences, in general terms, can be for example:

- kinematic redundancy of a machine/robot to assure better dynamic performance through frequency uncoupling of the redundant axes;
- geometric redundancy of a thermo-hydraulic system to assure lower consumption through frequency uncoupling of the redundant flow rates;
- the construction of redundant heating (conditioning) plants with slow moduli, dedicated to assure a minimum temperature, and moduli with more rapid dynamics for daily variations.

Particular examples of operating machines can be, in addition to planar and three-dimensional laser machines, pick and place systems, machine tools in general such as milling machines for mould machining or wood working machines.

In accordance with the above, the invention therefore relates also to a method for managing systems provided with redundant actuators of the type comprising at least a first system operating according to a first set of variables, representative of a physical quantity to be controlled and a second system operating according to a second set of said variables, representative of a physical quantity to be controlled, said first set of variables and second set of variables identifying one or more redundant variables, said method comprising the operations of:

commanding said actuators of said system through a numeric control unit and a servo control module to follow trajectories of said variables as a function of a set sequence, said method comprising the operations of:
- interpolating said sequence to obtain a trajectory of the system with redundant actuators,
- operating a filtering action on said trajectory of the system with redundant actuators to generate a trajectory of the first system,
- calculating a second trajectory of the second system as difference trajectory between said trajectory of the system with redundant actuators and said trajectory of the first system,
- providing said trajectory of the first system to said servo-control for the actuation of the first system.

It is clear from the above that the method according to the invention can also be applied to more than two systems with redundant axes.

The invention claimed is:

1. A method for managing an operating machine provided with redundant actuators of the type comprising at least a first system (3, 5) operating according to a first set of variables, representative of a first set of axes of motion (X, Y) and a second system (17) operating according to a second set of said variables, representative of a, a second set of axes of motion (u, v), said first set of axes (X, Y) and second set of axes (u, v) identifying one or more redundant axes of motion, said method comprising the operations of:
commanding said actuators (13, 14) of said operating machine through a numeric control unit (50) and a servo control module (53) to follow motion trajectories of said variables ((Xs, Ys), (X, Y), (u, v)) as a function of a set motion sequence (P)

wherein
said method comprises the operations of:
providing said motion sequence (P) in the form of a set of instructions corresponding to a part program including a preparation code (101) identifying the function to be initiated to set said motion trajectories as curves in a three-dimensional space to be followed by said operating machine, interpolating (100), based on the sequence of instructions, said set motion sequence (P) under the control of said preparation code (101) to obtain a motion trajectory of the operating machine with redundant actuators ((Xs, Ys)), operating a filtering (110) on said trajectory of the operating machine with redundant actuators ((Xs, Ys)) to generate a trajectory of the first system ((X, Y));

calculating (120) a second trajectory of the second system ((u, v)) as difference trajectory between said trajectory of the operating machine with redundant actuators ((Xs, Ys)) and said trajectory of the first system ((X, Y)), providing (130) said trajectory of the first system ((X, Y)) to said servo-control (53) for the actuation of the first system (3, 5), providing said trajectory of the second system ((u, v)) to said servo-control (53) for the actuation of the second system (17).

2. Method as claimed in claim 1, wherein said filtering operation (110) comprises the step of filtering trajectory characteristics to be carried onto the trajectory of the second system (u,v).

3. Method as claimed in claim 2, wherein said filtering operation (110) comprises removing from the trajectory of the system with redundant actuators (Xs, Ys) excursions having a modulus that is smaller than a threshold value.

4. Method as claimed in claim 2, wherein said filtering operation (110) comprises removing frequency components, in particular high frequency components, from the trajectory of the system with redundant actuators ((Xs, Ys)).

5. Method as claimed in claim 2, wherein said operation of calculating a second trajectory of the second system ((u, v)) as difference trajectory comprises the step of obtaining complementary trajectory elements and/or frequency components as trajectory of the second system ((u, v)), operating differences between the components (u=Xs−X; v=Ys−Y) of the trajectory of the machine with redundant actuators ((Xs, Ys)) and of the trajectory of the first system ((X, Y)).

6. Method as claimed in claim 5, wherein said first system (3, 5) operates at a lower acceleration than said second system (17).

7. Method as claimed in claim 6, wherein said first system (3, 5) operates at a higher speed than said second system (17).

8. Method as claimed in claim 7, wherein said filtering operation (110) comprises removing from the trajectory of the machine (Xs, Ys) trajectory elements that require operating with angles or radii of curvature below a threshold value.

9. Method as claimed in claim 7, wherein said filtering operation (110) comprises removing from the trajectory of the machine (Xs, Ys) specific shapes and/or curves elements.

10. An operating machine of the type comprising at least a first system (3, 5) operating according to a first set of variables, representative of a first set of axes of motion (X, Y) and a second system (17) operating according to a second set of variables, representative of a second set of axes of motion (u, v), said first set of axes (X, Y) and second set of axes (u, v) defining one or more redundant axes of motion, said operating machine further comprising a numeric control unit (50) and a servo-control module (53) configured to command actuators (13, 14) of said operating machine through a numeric control unit (50) and a servo-control module (53) to follow motion trajectories ((Xs, Ys), (X, Y), (u, v)) as a function of a set sequence of motion (P)

wherein
said numeric control unit (50) is configured for:
- providing said motion sequence (P) in the form of a set of instructions corresponding to a part program including a preparation code (101) identifying the function to be initiated to set said motion trajectories as curves in a three-dimensional space to be followed by said operating machine,
- interpolating (100), based on the sequence of instructions, said set motion sequence (P) under the control of said preparation code (101) to obtain a motion trajectory of the operating machine with redundant actuators ((Xs, Ys),
- operating a filtering (110) on said trajectory of the operating machine with redundant actuators ((Xs, Ys)) to generate a trajectory of the first system ((X, Y));
- calculating (120) a second trajectory of the second system ((u, v)) as difference trajectory between said trajectory of the operating machine with redundant actuators ((Xs, Ys)) and said trajectory of the first system ((X, Y)),
- providing (130) said trajectory of the first system ((X, Y)) to said servo-control (53) for the actuation of the first system (3, 5), said numeric control unit (50) being also configured to provide said trajectory of the second system ((u, v)) to said servo-control (53) for the actuation of the second system (17).

11. Operating machine as claimed in claim 10, wherein said operating machine is a laser operating machine, said first system (3, 5) comprises a support system and a movable equipment, said second system comprises a laser head.

12. Operating machine as claimed in claim 11, wherein said operating machine is a milling machine.

* * * * *